US007357712B2

(12) United States Patent
Mead et al.

(10) Patent No.: US 7,357,712 B2
(45) Date of Patent: *Apr. 15, 2008

(54) METHOD AND GAMING DEVICE OF OPERATING A MULTIPLE ROUND GAME THAT INCLUDES DIMINISHING SELECTION SETS

(75) Inventors: Randall D. Mead, Reno, NV (US); Bayard S. Webb, Sparks, NV (US); Ryan W. Cuddy, Reno, NV (US); John H. Zielinski, Reno, NV (US)

(73) Assignee: IGT, Reno, NV (US)

( * ) Notice: Subject to any disclaimer, the term of this patent is extended or adjusted under 35 U.S.C. 154(b) by 577 days.

This patent is subject to a terminal disclaimer.

(21) Appl. No.: 10/923,570

(22) Filed: Aug. 20, 2004

(65) Prior Publication Data

US 2005/0020345 A1 Jan. 27, 2005

Related U.S. Application Data

(63) Continuation of application No. 10/462,434, filed on Jun. 16, 2003, now Pat. No. 6,783,458, which is a continuation of application No. 09/966,855, filed on Sep. 28, 2001, now Pat. No. 6,609,974.

(51) Int. Cl.
*A63F 13/00* (2006.01)

(52) U.S. Cl. ........................... 463/16; 463/17; 463/18; 463/19; 463/20; 463/25; 463/26; 463/27; 463/28

(58) Field of Classification Search .................. 463/16, 463/25, 17, 18, 19, 20, 26, 27, 28
See application file for complete search history.

(56) References Cited

U.S. PATENT DOCUMENTS 4,327,919 A * 5/1982 Vennor ........................ 273/236
4,582,324 A * 4/1986 Koza et al. .................... 463/16
4,695,053 A * 9/1987 Vazquez, Jr. et al. ......... 463/18

(Continued)

FOREIGN PATENT DOCUMENTS

DE 199 26 280 A1 3/2000

(Continued)

OTHER PUBLICATIONS

Double Up Poker Game Description written by IGT, available prior to 2001.

(Continued)

*Primary Examiner*—Robert Pezzuto
*Assistant Examiner*—Christopher H Bond
(74) *Attorney, Agent, or Firm*—Bell, Boyd & Lloyd LLP

(57) ABSTRACT

A method of controlling a gaming device is provided in which a set of a plurality of selections is displayed. The player is enabled to pick one of the selections. After one of the selections is picked by the player, an award is generated and provided from an award pool. One of the selections is eliminated from the set. The above steps are repeated until the player's picked selection is the same as the eliminated selection, wherein the set in each repeated step is reduced to include non-eliminated selections.

33 Claims, 8 Drawing Sheets

U.S. PATENT DOCUMENTS 5,034,807 A * 7/1991 Von Kohorn .................. 725/5
5,205,555 A * 4/1993 Hamano ................. 273/143 R
5,342,047 A * 8/1994 Heidel et al. ................. 463/29
5,393,057 A * 2/1995 Marnell, II ................. 463/13
5,711,525 A * 1/1998 Breeding .................... 273/292
5,769,716 A * 6/1998 Saffari et al. ................. 463/20
5,772,509 A * 6/1998 Weiss .......................... 463/16
5,890,962 A * 4/1999 Takemoto .................... 463/20
5,911,418 A * 6/1999 Adams ....................... 273/274
5,919,088 A * 7/1999 Weiss ............................ 463/9
5,927,714 A * 7/1999 Kaplan ................... 273/143 R
5,941,770 A * 8/1999 Miers et al. .................. 463/13
5,941,773 A * 8/1999 Harlick ........................ 463/26
5,944,314 A * 8/1999 Stavinsky ................... 273/292
5,951,397 A * 9/1999 Dickinson .................... 463/36
5,980,384 A 11/1999 Barrie
5,997,401 A 12/1999 Crawford
6,015,346 A 1/2000 Bennett
6,059,289 A 5/2000 Vancura
6,062,980 A 5/2000 Luciano
6,089,976 A 7/2000 Schneider et al.
6,102,798 A 8/2000 Bennett
6,120,031 A 9/2000 Adams
6,126,542 A 10/2000 Fier
6,155,925 A 12/2000 Giobbi et al.
6,159,097 A 12/2000 Gura
6,159,098 A 12/2000 Slomiany et al.
6,164,652 A 12/2000 Lauretta et al.
6,174,233 B1 1/2001 Sunaga et al.
6,174,234 B1 1/2001 Seibert, Jr. et al.
6,174,235 B1 1/2001 Walker et al.
6,186,894 B1 2/2001 Mayeroff
6,190,254 B1 2/2001 Bennett
6,190,255 B1 2/2001 Thomas et al.
6,203,429 B1 3/2001 Demar et al.
6,210,279 B1 4/2001 Dickinson
6,227,969 B1 5/2001 Yoseloff
6,231,442 B1 5/2001 Mayeroff
6,231,445 B1 5/2001 Acres
6,238,288 B1 5/2001 Walker et al.
6,261,177 B1 7/2001 Bennett
6,309,300 B1 10/2001 Glavich
6,315,664 B1 11/2001 Baerlocher et al.
6,319,124 B1 11/2001 Baerlocher et al.
6,331,143 B1 12/2001 Yoseloff
6,343,988 B1 2/2002 Walker et al.
6,346,043 B1 2/2002 Colin et al.
6,347,996 B1 2/2002 Gilmore et al.
6,364,766 B1 4/2002 Anderson et al.
6,364,767 B1 4/2002 Brossard et al.
6,390,473 B1 5/2002 Vancura et al.
6,413,161 B1 * 7/2002 Baerlocher et al. ........... 463/20
6,435,511 B1 8/2002 Vancura et al.
6,439,995 B1 * 8/2002 Hughs-Baird et al. ........ 463/20
6,511,375 B1 * 1/2003 Kaminkow .................. 463/20
6,554,283 B2 4/2003 Vancura et al.
6,585,591 B1 7/2003 Baerlocher et al.
6,609,974 B2 * 8/2003 Mead et al. .................. 463/25
6,632,141 B2 * 10/2003 Webb et al. .................. 463/25
6,663,489 B2 * 12/2003 Baerlocher ................... 463/20
6,692,005 B2 2/2004 Vancura et al.
6,733,386 B2 * 5/2004 Cuddy et al. ................. 463/17
6,749,502 B2 * 6/2004 Baerlocher ................... 463/16
6,783,458 B2 * 8/2004 Mead et al. .................. 463/25
6,802,775 B2 * 10/2004 Baerlocher et al. ........... 463/16
6,852,028 B2 * 2/2005 Vancura ....................... 463/16
6,913,533 B2 * 7/2005 Cuddy et al. ................. 463/16
7,004,835 B2 * 2/2006 Baerlocher ................... 463/16
7,040,983 B2 * 5/2006 Dolloff et al. ................ 463/16
7,056,209 B2 * 6/2006 Baerlocher et al. ........... 463/16
7,059,967 B2 * 6/2006 Baerlocher ................... 463/20
7,128,646 B2 * 10/2006 Baerlocher et al. ........... 463/16
7,160,186 B2 * 1/2007 Cuddy et al. ................. 463/16
2003/0027616 A1 * 2/2003 Vancura ....................... 463/16
2003/0036420 A1 * 2/2003 Baerlocher et al. ........... 463/16
2003/0045338 A1 * 3/2003 Dolloff et al. ................ 463/16
2003/0045349 A1 * 3/2003 Hughs-Baird ................ 463/25
2003/0060254 A1 * 3/2003 Cuddy et al. ................. 463/16
2003/0100358 A1 * 5/2003 Kaminkow .................. 463/20
2003/0216162 A1 * 11/2003 Vancura ....................... 463/10
2004/0097282 A1 * 5/2004 Baerlocher et al. ........... 463/16
2004/0152500 A1 * 8/2004 Baerlocher ................... 463/16
2004/0204223 A1 * 10/2004 Cuddy et al. ................. 463/17
2004/0214632 A1 * 10/2004 Cuddy et al. ................. 463/25
2004/0242301 A1 * 12/2004 Baerlocher ................... 463/16
2005/0153770 A1 * 7/2005 Vancura ....................... 463/16
2006/0025196 A1 * 2/2006 Webb et al. .................. 463/16
2006/0116190 A1 * 6/2006 Baerlocher ................... 463/16
2006/0205465 A1 * 9/2006 Dolloff et al. ................. 463/9
2007/0111783 A1 * 5/2007 Cuddy et al. ................. 463/23

FOREIGN PATENT DOCUMENTS

DE 19926280 A1 * 3/2000
EP 0 945 837 A2 9/1999
GB 2 197 974 A 6/1988
GB 2197974 A * 6/1988
GB 2 262 642 A 6/1993
GB 2262642 A * 6/1993
WO WO 00/12186 3/2000

OTHER PUBLICATIONS

Janken-8 II Advertisement written by Hsin Chen Wen Enterprises, published prior to 2001.
Polly & Roger Advertisement written by VLC, Inc., published in 2000.
Top Gear Advertisement written by Aristocrat Leisure Industries Pty. Ltd, published in Sep. 1995.
Jackpot Party Brochures and Articles written by WMS Gaming, Inc., published in 1998.
Texas Teas Advertisement written by IGT, published in 2000.
Adams Family Article written by Strictly Slots, published in Jul. 2000.
Price is Right Advertisement written by IGT, published in 2001.
Austin Powers Advertisement written by IGT, published in 2001.
I.C. Money Advertisement written by Atronic, published in 2000.
Spiker the Biker Advertisement written by Barcrest, published prior to 2001.
State Fair written by IGT, published prior to 2001.
Addams Family Advertisement written by IGT, published in 2001.

* cited by examiner

FIG. 5

ALLOTTED NUMBER TABLE

| | |
|---|---|
| CHOICE 1 | 1, 2, 3, 4, 5 |
| CHOICE 2 | 2, 4, 6 |
| CHOICE 3 | 1, 2, 4 |
| CHOICE 4 | 2, 3, 4, 5, 6 |
| CHOICE 5 | 1, 3, 5, 7 |

FIG. 6

AWARD POOL

| | |
|---|---|
| ROUND1 | 5 |
| ROUND2 | 10 |
| ROUND3 | 15 |
| ROUND4 | 20 |
| BONUS | 50 |

METHOD AND GAMING DEVICE OF OPERATING A MULTIPLE ROUND GAME THAT INCLUDES DIMINISHING SELECTION SETS

PRIORITY CLAIM

This application is a continuation of and claims the benefit of U.S. patent application Ser. No. 10/462,434, filed Jun. 16, 2003, entitled, "METHOD OF OPERATING A MULTIPLE ROUND GAME THAT INCLUDES PLAYER CHOICES AND GAME CHOICES", now U.S. Pat. No. 6,783.458, which is a continuation of U.S. patent application Ser. No. 09/966,855, filed Sep. 28, 2001, entitled, "GAMING DEVICE HAVING A MULTIPLE ROUND GAME THAT INCLUDES PLAYER CHOICES AND PROCESSOR CHOICES", now U.S. Pat. No. 6,609,974.

CROSS REFERENCES TO RELATED APPLICATIONS

This application is related to the following co-pending commonly owned applications: "GAMING DEVICE HAVING A BONUS ROUND WITH MULTIPLE RANDOM AWARD GENERATION AND MULTIPLE RETURN/RISK SCENARIOS," Ser. No. 09/678,989, now U.S. Pat. No. 6,776,711; "GAMING DEVICE HAVING BONUS ROUND WITH A WIN, LOSE OR DRAW OUTCOME," Ser. No. 09/772,763, now U.S. Pat. No. 6,425,824; "GAMING DEVICE HAVING BONUS ROUND WITH A WIN, LOSE OR DRAW OUTCOME," Ser. No. 10/163,805, now U.S. Pat. No. 7,037,192; "GAMING DEVICE HAVING AN AWARD EXCHANGE BONUS ROUND AND METHOD FOR REVEALING AWARD EXCHANGE POSSIBILITIES," Ser. No. 09/689,510, now abandoned; "GAMING DEVICE HAVING A MULTI-ROUND BONUS SCHEME WHEREIN EACH ROUND HAS A PROBABILITY OF SUCCESS," Ser. No. 09/688,441, "GAMING DEVICE HAVING GRADUATING AWARD EXCHANGE SEQUENCE WITH A TEASE CONSOLATION SEQUENCE AND AN INITIAL QUALIFYING SEQUENCE," Ser. No. 09/680,601, now U.S. Pat. No. 6,811,483; "GAMING DEVICE HAVING RELATED MULTI-GAME BONUS SCHEME," Ser. No. 09/688,972, now U.S. Pat. No. 6,634,943; "GAMING DEVICE HAVING AN INDICATOR SELECTION WITH PROBABILITY-BASED OUTCOME BONUS SCHEME," Ser. No. 09/981,163, now U.S. Pat. No. 6,783,457; "GAMING DEVICE HAVING A MULTIPLE SELECTION AND AWARD DISTRIBUTION BONUS SCHEME," Ser. No. 09/688,635, now U.S. Pat. No. 6,599,185; "GAMING DEVICE HAVING ACHIEVEMENT CRITERIA FOR ADVANCEMENT," Ser. No. 09/960,784, now U.S. Pat. No. 7,066,814; "GAMING DEVICE HAVING TERMINATION VARIABLES," Ser. No. 09/966,658, now U.S. Pat. No. 6,607,438; "GAMING DEVICE HAVING A BONUS SCHEME WITH MULTIPLE POTENTIAL AWARD SETS," Ser. No. 09/822,697, now U.S. Pat. No. 6,796,899; "GAMING DEVICE HAVING A BONUS ROUND WITH A WIN, LOSE OR DRAW OUTCOME," Ser. No. 10/163,805, now U.S. Pat. No. 7,037,192; and "GAMING DEVICE HAVING AN INDICATOR SELECTION WITH PROBABILITY-BASED OUTCOME," Ser. No. 09/990,693, now U.S. Pat. No. 6,676,516.

DESCRIPTION

The present invention relates in general to a gaming device, and more particularly to a gaming device that includes a multi-round game wherein the player accumulates awards, and maximizes award accumulation by selecting a different choice from a set of choices than a choice generated by the processor of the gaming device.

BACKGROUND OF THE INVENTION

Known gaming devices associate awards with masked selections. European Patent Application No. EP 0 945 837 A2, filed on Mar. 18, 1999 and assigned on its face to WMS Gaming, Inc., discloses a slot machine game, wherein the gaming device operates in a normal slot machine or basic mode by randomly selecting a basic game outcome from a plurality of basic game outcomes. If the game selects a start bonus outcome, the gaming device shifts from the normal slot machine or basic mode to a bonus mode.

In the bonus mode, which operates under player control, the player has one or more opportunities to pick masked selections. The masked selections mask awards and end-bonus outcomes. When the player picks a masked selection associated with an award, the game reveals the award and provides the award to the player. When the player picks a masked selection associated with an end-bonus outcome, the bonus mode no longer enables the player to pick masked selections.

The select-until or do-until selection loop is exciting for the player because the player accrues awards until picking an end-bonus outcome. The do-until selection loop provides the player with the sense that the player controls the player's own destiny. The game of the European Patent Application No. EP 0 945 837 A2 is somewhat limited in that it provides and displays a single masked selection pool from which the player selects. Upon the first pick of an end-bonus outcome, the game ends. There is, therefore, a continuing need for more enjoyable and entertaining do-until types of games for gaming devices.

SUMMARY OF THE INVENTION

The present invention provides a gaming device having a game that may be implemented in a primary or bonus game. More specifically, the present invention provides a processor controlled gaming device that includes a multi-round game wherein each round includes a player choice and a game choice. In one primary embodiment, the gaming device includes a plurality of rounds, and begins a first round by assigning an allotted number to each choice in a set of choices. The gaming device displays the set of choices on a display to a player. The gaming device prompts the player to select one of the choices. Upon the player's pick of one of the choices, the gaming device starts an award sequence for the first round.

In the sequence, the gaming device generates one of the choices and in association with generating the choice, the gaming device also generates an award for the player. The gaming device employs one or more well known random generation devices to generate the choice and the award. Alternatively, the gaming device only generates an award when the player's choice is generated or when one of a number of choices is generated.

The gaming device repeats the generation of choices and awards until, in one implementation, a choice of the set has been generated its allotted number of times. In another implementation, the gaming device repeats the generation of choices and awards until more than one or all of the choices of the set have been generated their allotted number of times. The gaming device adds or otherwise accumulates each award generated during the sequence.

When the generation device has generated one or more or all of the choices its allotted number of times, the sequence of the first round ends. The player's award for the first round in a preferred embodiment includes each award generated for each choice of the set.

The player's award depends in part upon the number assigned to each choice. The higher the numbers, the more times a choice can be generated and the more times an award for the choice may be generated. In a preferred embodiment, different choices of the sets will have different allotted numbers and generate more or less awards.

In this primary embodiment, after a sequence ends, a random generation device randomly picks a choice from the set. The gaming device then makes a comparison between the player's initial pick of a choice for the round and the choice of the set that the game randomly picked. If the choice that the player has selected is the same as the choice that the game has randomly picked, then no further rounds occur and the game ends.

If the choice that the player selects is different than the choice that the random generation device picks, the gaming device determines whether another round exists. That is, the gaming device stores a number of rounds for each game. If the player survives each round stored in memory without selecting the same choice that the gaming device randomly picks, the gaming device provides an extra bonus award and then ends the game.

If another round exists, the gaming device removes the choice generated by the gaming device in the previous sequence from the set. The gaming device also selects from memory another award pool from which the random generation device generates awards in the next sequence. In a preferred embodiment, the game chooses a new award pool that has higher average value awards than the previous award pool. The game then repeats the process herein described by assigning an allotted number to each choice for the next round and the next sequence.

In another primary embodiment, the gaming device proceeds substantially as described above. That is, the gaming device displays a set of choices for a first round to the player and prompts the player to select a choice. Upon the player's pick of a choice, the gaming device begins the sequence for the first round. Once again, a random generation device generates choices from a set of choices displayed during the sequence. A random generation device also generates awards and preferably generates the awards one to one with the generation of the choices.

In this primary embodiment however, the sequence ends when the first choice of the set is generated its allotted number of times. In the previous primary embodiment, a plurality of choices of the first set may have to be generated their allotted number of times. Also different in this sequence, the gaming device does not randomly pick a choice from the set at the end of the sequence. Rather, the choice that has been generated its allotted number of times is the choice that the gaming device compares to the choice selected by the player.

In this primary embodiment, the player's award for each round preferably includes each award generated in the set. In this primary embodiment, the award for each round may be less than the award per round in the previous primary embodiment when, in the previous embodiment, a plurality of choices are generated their allotted number of times.

A number of different data tables may be employed for randomly assigning an allotted number to each choice and for generating awards within any given round. Certain additional events contemplated by the present invention include a randomly occurring event that lessens the number of times that one or more choices have been generated. For example, if a particular choice has an allotted number of five and has been generated four times within the round, it can only be generated one more time. The random event however lessens the number of times, e.g., from four to two or four to zero, so that now the choice can be generated three more times. Another randomly occurring event includes an event that multiplies one or more of the awards generated during the round.

It is therefore an advantage of the present invention to provide a gaming device that has a do-until routine employing multiple rounds.

It is another advantage of the present invention to provide a gaming device that has multiple rounds, wherein each round pits a player's choice against a choice made by the gaming device.

It is a further advantage of the present invention to provide a gaming device that has multiple rounds, wherein each round has a plurality of choices each having an allotted number, and wherein the round ends when a first choice is generated by the gaming device its allotted number of times.

It is still another advantage of the present invention to provide a gaming device that has multiple rounds, wherein each round has a plurality of choices each having an allotted number, and wherein the round ends when each choice is generated by the gaming device its allotted number of times.

It is yet another advantage of the present invention to provide a gaming device that has multiple rounds, wherein each round has a plurality of choices each having an allotted number, and wherein the round provides an award to the player based on a number of times that the gaming device generates choices within the round.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 5 schematically illustrates an area of memory having one embodiment of a data table for assigning an allotted number to each choice of the present invention.

FIG. 6 schematically illustrates an area of memory having one embodiment of a data table for generating awards of the present invention.

DETAILED DESCRIPTION OF THE INVENTION

Gaming Device and Electronics

Figure 1A:
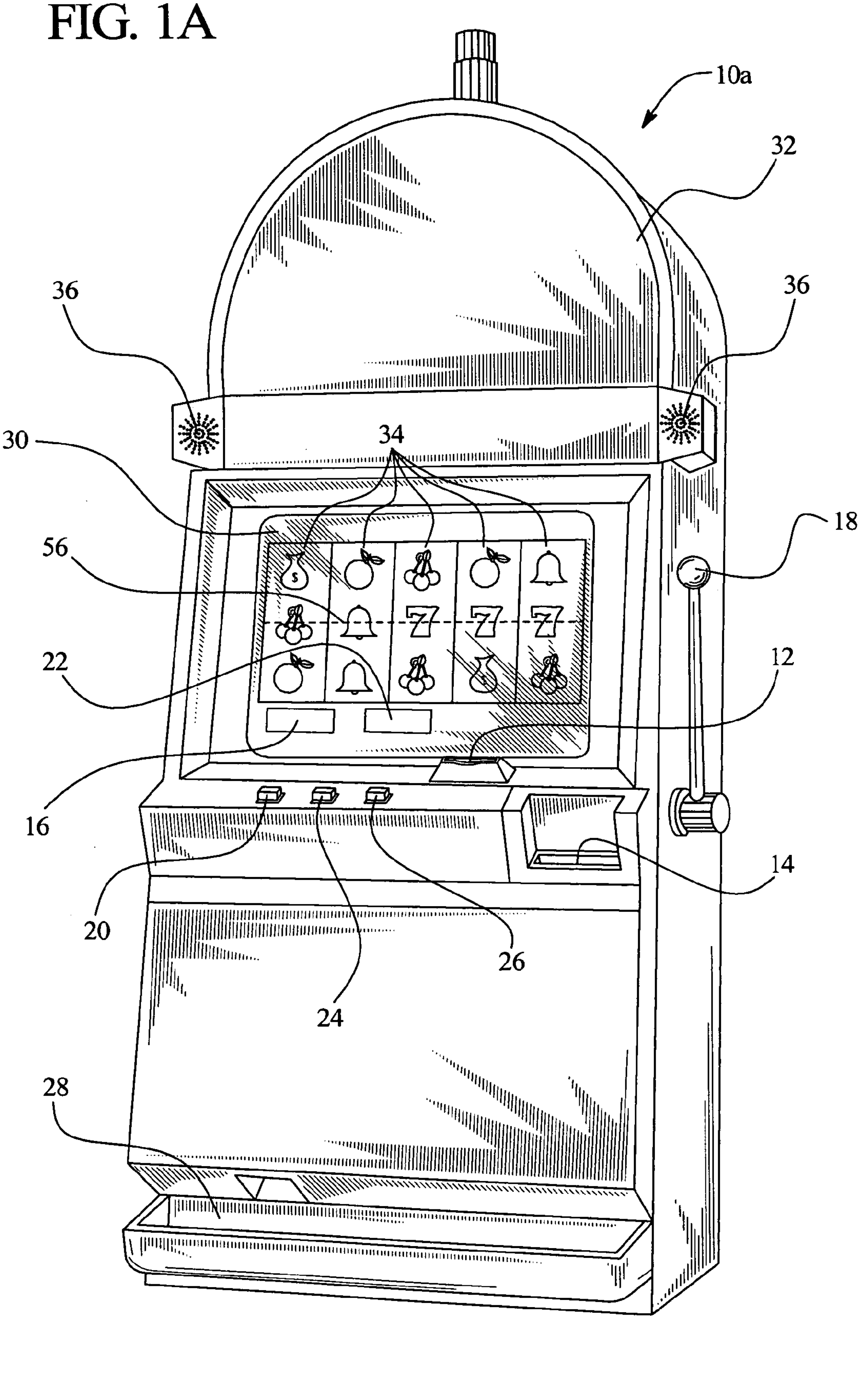
FIG. 1A is a front perspective view of one embodiment of the gaming device of the present invention.
Figure 1B:
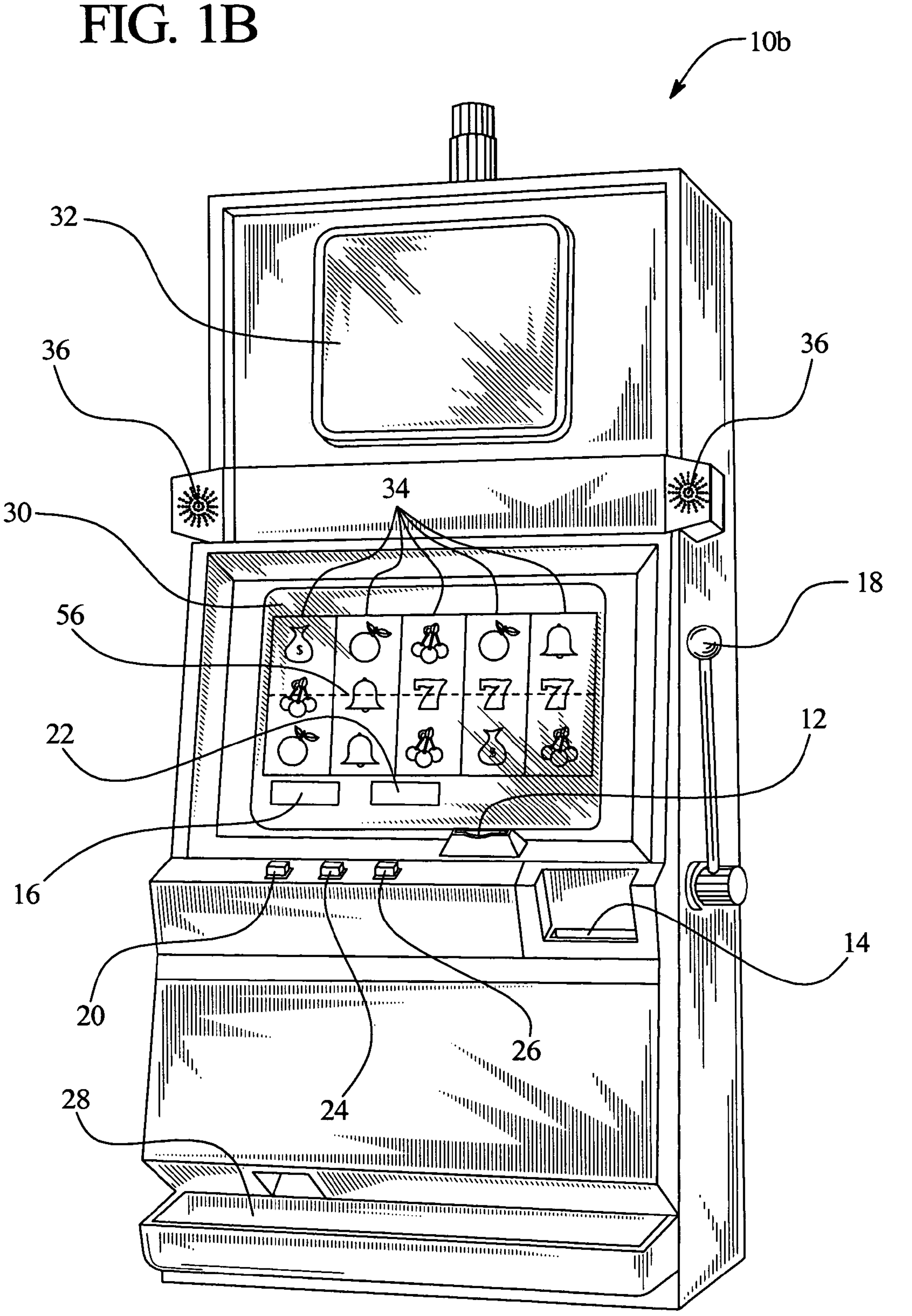
FIG. 1B is a front perspective view of another embodiment of the gaming device of the present invention.

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game (described below) being a stand alone game or a bonus or secondary game that coordinates with a base game. When the game of the present invention is a bonus game, gaming device 10 in one base game is a slot machine having the controls, displays and features of a conventional slot machine, wherein the player operates the gaming device while standing or sitting. Gaming device 10 also includes being a pub-style or table-top game (not shown), which a player operates while sitting.

The base games of the gaming device 10 include slot, poker, blackjack or keno, among others. The gaming device 10 also embodies any bonus triggering events, bonus games as well as any progressive game coordinating with these base games. The symbols and indicia used for any of the base, bonus and progressive games include mechanical, electrical or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. At any time during the game, a player may "cash out" by pushing a cash out button 26 to receive coins or tokens in the coin payout tray 28 or other forms of payment, such as an amount printed on a ticket or credited to a credit card, debit card or smart card. Well known ticket printing and card reading machines (not illustrated) are commercially available.

Gaming device 10 also includes one or more displays. The embodiment shown in FIG. 1A includes a central display 30, and the alternative embodiment shown in FIG. 1B includes a central display 30 as well as an upper display 32. The displays display any visual representation or exhibition, including but not limited to movement of physical objects such as mechanical reels and wheels, dynamic lighting and video images. The display includes any viewing surface such as glass, a video monitor or screen, a liquid crystal display or any other static or dynamic display mechanism. In a video poker, blackjack or other card gaming machine embodiment, the display includes displaying one or more cards. In a keno embodiment, the display includes displaying numbers.

The slot machine base game of gaming device 10 preferably displays a plurality of reels 34, preferably three to five reels 34, in mechanical or video form on one or more of the displays. Each reel 34 displays a plurality of indicia such as bells, hearts, fruits, numbers, letters, bars or other images which preferably correspond to a theme associated with the gaming device 10. If the reels 34 are in video form, the display displaying the video reels 34 is preferably a video monitor. Each base game, especially in the slot machine base game of the gaming device 10, includes speakers 36 for making sounds or playing music.

Figure 2:
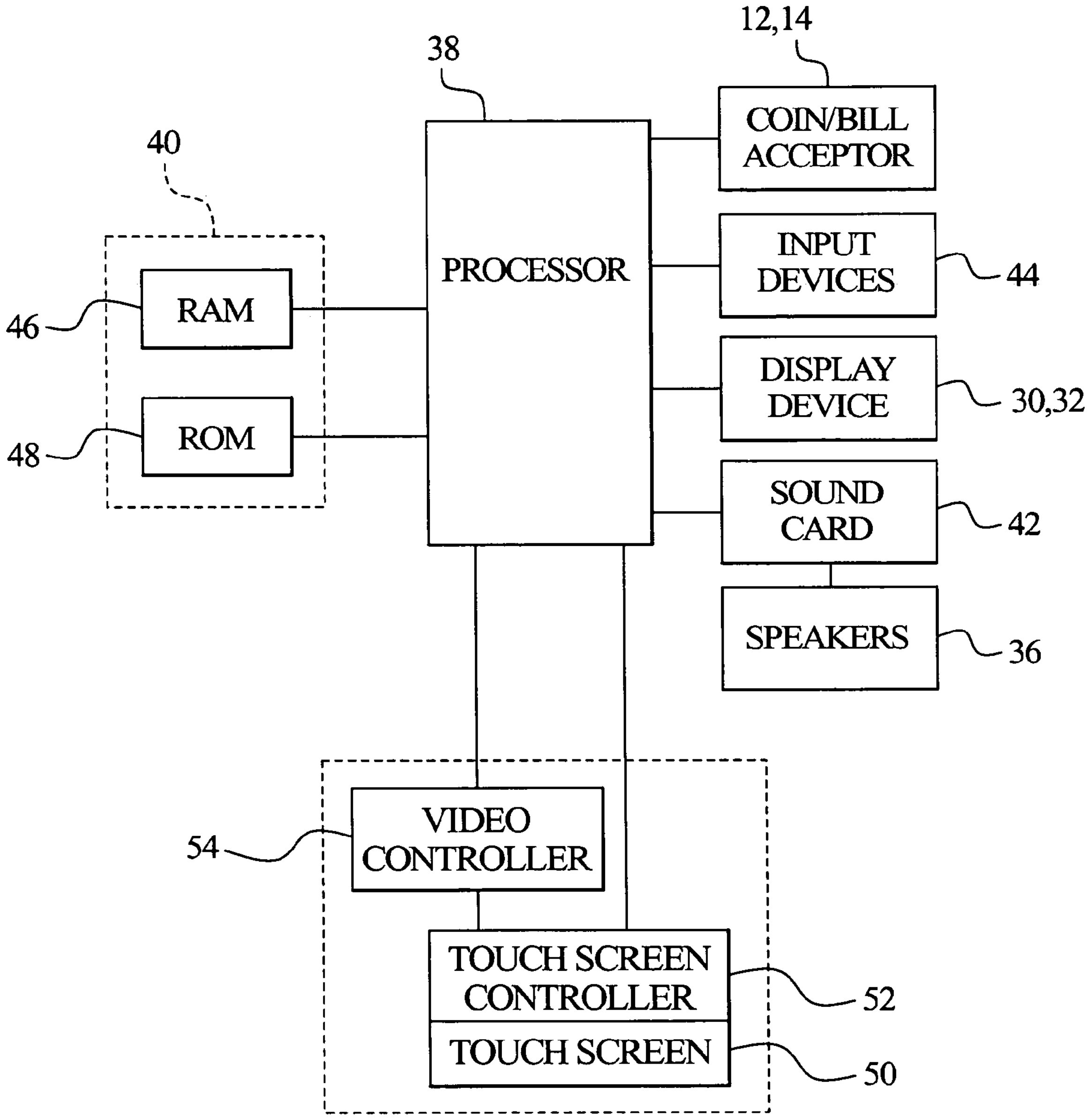
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display 30; an upper display 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. The gaming device 10 preferably employs a video-based display 30 or 32 for the bonus games. The bonus games include a program that automatically begins when the player achieves a qualifying condition in the base game.

In the slot machine embodiment, the qualifying condition includes a particular symbol or symbol combination generated on a display. As illustrated in the five reel slot game shown in FIGS. 1A and 1B, the qualifying condition includes the number seven appearing on, e.g., three adjacent reels 34 along a payline 56. It should be appreciated that the present invention includes one or more paylines, such as payline 56, wherein the paylines can be horizontal, diagonal or any combination thereof. An alternative scatter pay qualifying condition includes the number seven appearing on, e.g., three adjacent reels 34 but not necessarily along a payline 56, appearing on any different set of reels 34 three times or appearing anywhere on the display the necessary number of times.

Figure 3:
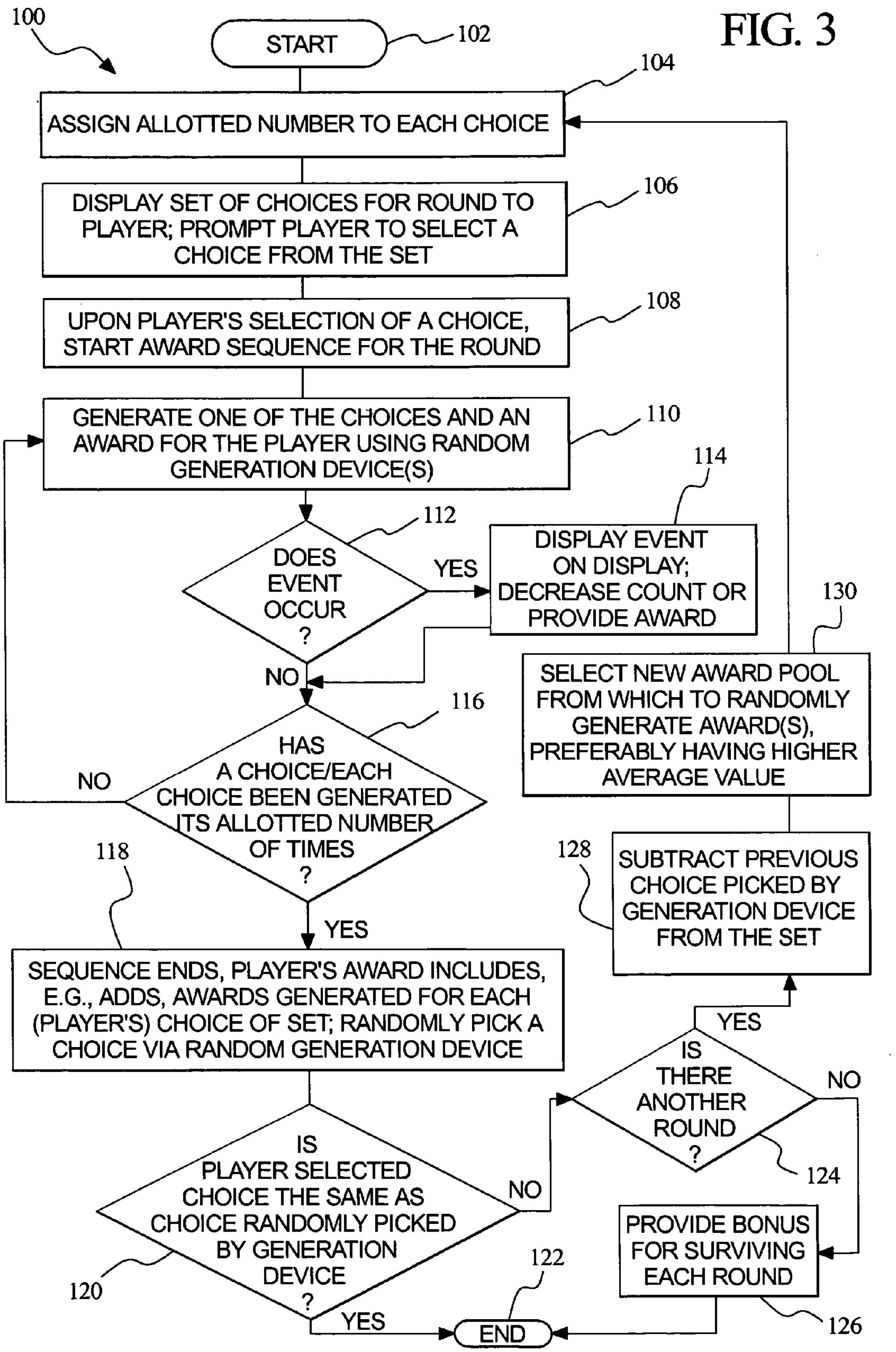
FIG. 3 is a logic flow diagram for one embodiment of a game program of the present invention.

Referring now to FIG. 3, upon the occurrence of the qualifying condition or triggering event, the gaming device 10 begins a game sequence 100 embodying one primary embodiment of the present invention, as indicated by oval 102. The gaming device 10 assigns an allotted number to each choice of a set, as indicated by block 104. The gaming device 10 displays the set of choices on a display 30 or 32, as indicated by block 106. The gaming device 10 does not in a preferred embodiment display the allotted number associated with each choice of the set. However, in an alternative embodiment the gaming device 10 displays the allotted numbers. The gaming device 10 prompts the player to select a choice from the set, as also indicated by block 106. The gaming device includes a selector such as a touch screen or other suitable device including electromechanical or mechanical buttons or indicators for enabling the player to pick a choice. The gaming device 10 may employ an audio, visual, or audiovisual prompt that is in a preferred embodiment in accordance with a theme of the invention.

Upon a player's pick of a choice from the set displayed on the display 30 or 32, gaming device 10 begins an award sequence for the first round, as indicated by block 108. A sequence of the present invention includes the generation of choices using a random generation device and a generation of awards using the same or a different random generation device. The random generation device in one embodiment includes the processor randomly determining choices and awards. The player may be allowed to select a choice at any time before the award sequence begins.

In the award sequence, the gaming device 10 generates one of the choices and an award for the player using one or more random generation devices as indicated by block 110. Data tables for generating the awards are described below. During or after the generation of a choice and an associated award, the gaming device 10 randomly determines whether to provide a modifier event such as a number or choice changing event, as indicated by diamond 112. If the gaming device 10 generates a modifier event such as a number or choice changing event, the display 30 or 32 displays the event, as indicated by block 114. The events include decreasing a number of times that one or more choices has been generated, so as to allow such choices to be generated more times before those choices reach their allotted number. For example, the event can reset each choice to zero so that the sequence, in effect, starts over. The player, however, keeps any awards provided before the event occurs.

The modifier event may also include providing a multiplier for the player. For example, in one embodiment, the event includes randomly generating one of the choices, and if the choice generated is the choice that the player has selected, gaming device 10 provides a multiplier. The multiplier may be adapted to multiply a previously generated award, each award that has been generated within the current award sequence, or the player's total accumulated award for each round.

Whether or not an event occurs, the gaming device 10 in one implementation determines whether a choice of the set on the display 30 or 32 has been generated its allotted number of times as indicated by diamond 116. If a choice has not been generated its allotted number of times, the game program returns to block 110, wherein a random generation device of the gaming device 10 generates one of the choices and an award in association with one of the choices. It should be appreciated, that the game program continues to loop and generate choices and awards until one of the choices has been generated its allotted number of times. During each loop, one of the modifier events described above may occur.

In an alternative embodiment, the gaming device 10 determines if a plurality of or all of the choices in the set have been generated their allotted number of times. Here, the game program continues to loop and generate choices and awards until a plurality or all of the choices are generated their respective allotted number of times.

As illustrated, in a preferred embodiment, the gaming device generates an award with each generation of a choice from the set. In alternative embodiments, the gaming device may be adapted to generate awards on a different basis. For example, the gaming device may be programmed to generate an award every other generation of a choice. Or, the game may only generate an award when the gaming device randomly generates the player's choice. Other implementations for generating awards in association with generating choices may be employed in accordance with the present invention.

When one, a plurality of or all of the choices have been generated their allotted number of times in a round, the award sequence ends as indicated by block 118. The player's award for the round and the sequence includes each award generated in association with the generation of the choices. In a preferred embodiment, gaming device 10 sums each award generated during the round. Alternatively, however, gaming device 10 may multiply the awards or provide some combination of multiplication and summation. In a preferred embodiment, the awards of the present invention are gaming device credits. The awards may alternatively be multipliers that multiply a number of gaming device credits. That is, the multipliers may multiply a player's wager or a component of the player's wager such as the bet per payline or the number of paylines played. The multipliers may also multiply a player's win along one or more paylines. The awards may further alternatively be other items of value such as a number of picks from a prize pool.

In one embodiment, the gaming device employs a random generation device to randomly pick one of the choices from the set, as also indicated by block 118. This random pick of a choice from the set is not for the purpose of generating an award for the player; rather, gaming device 10 compares the random pick to the player's selected choice (block 108), as indicated by diamond 120. That is, gaming device uses the comparison of choices to determine whether the player advances to a next round.

In this embodiment, the gaming device's pick of a choice in determining whether the player advances to the next round, as determined in connection with block 118, may be done at different points in the game program. For example, gaming device 10 may be adapted to pre-pick each choice for each round before beginning any of the rounds. Gaming device 10 can pick the choice at any point during the sequence of a round. Or, gaming device 10 may pick the choice after the sequence has ended, as illustrated by block 118.

If the player's selected choice and the game's randomly picked choice are the same, as determined in connection with diamond 120, the program of gaming device 10 ends as indicated by oval 122. At this point, gaming device 10 transfers or provides any accumulated award to the player.

If the choice selected by the player is not the same as the choice picked from the set by the generation device, gaming device 10 determines whether another round exists, as indicated by diamond 124. As illustrated in the data tables below, gaming device 10 in a preferred embodiment predetermines the number of rounds that the player may play. When the player plays each round, that is, survives each round without selecting the same choice that gaming device 10 randomly picks, gaming device 10 provides a bonus award to the player for surviving each round, as indicated by block 126. The bonus award in a preferred embodiment is relatively large compared to the awards provided in association with the choices. The bonus award may be a number of credits, a multiplier or may allow the player to play one or more extra award sequences. After providing the bonus award to the player, the game program of gaming device 10 ends, as indicated by oval 122.

If the player survives the round, as determined in connection with diamond 120, and another round exists, as determined in connection with diamond 124, the gaming device 10 performs a number of updates before the player begins the next round. One update that gaming device 10 makes in a preferred embodiment is the subtraction of the choice picked by the generation device in the previous round from the set of choices displayed in the next round, as indicated by block 128. That is, the set of choices displayed in the next round on the display 30 or 32 has, in a preferred embodiment, one less choice than the set displayed in the previous round. In this way, succeeding rounds become harder for the player to survive. It is more likely in successive rounds that the player selects the same choice that the gaming device randomly picks because there are less choices in the set.

Another update that gaming device 10 makes in a preferred embodiment is the selection of a new award pool as indicated by block 130. In a preferred embodiment, the next award pool has a higher average value of awards than the previous award pool. As the rounds become harder to advance through or survive, the rounds also preferably provide higher average awards. After gaming device 10 selects a new award pool, as indicated by block 130, gaming device 10 assigns new allotted numbers to the remaining choices of this set for the next round, as indicated by block 104.

It should be appreciated that in the game program embodying the method 100 of FIG. 3, gaming device 10 cycles through the above-described procedure until: (i) the player selects the same choice that gaming device 10 picks; or (ii) the player successfully plays each round stored in memory. Gaming device 10 accumulates the awards achieved during each round until one of the game ending events occurs, whereby gaming device 10 provides or downloads this accumulated award to the player.

Figure 4:
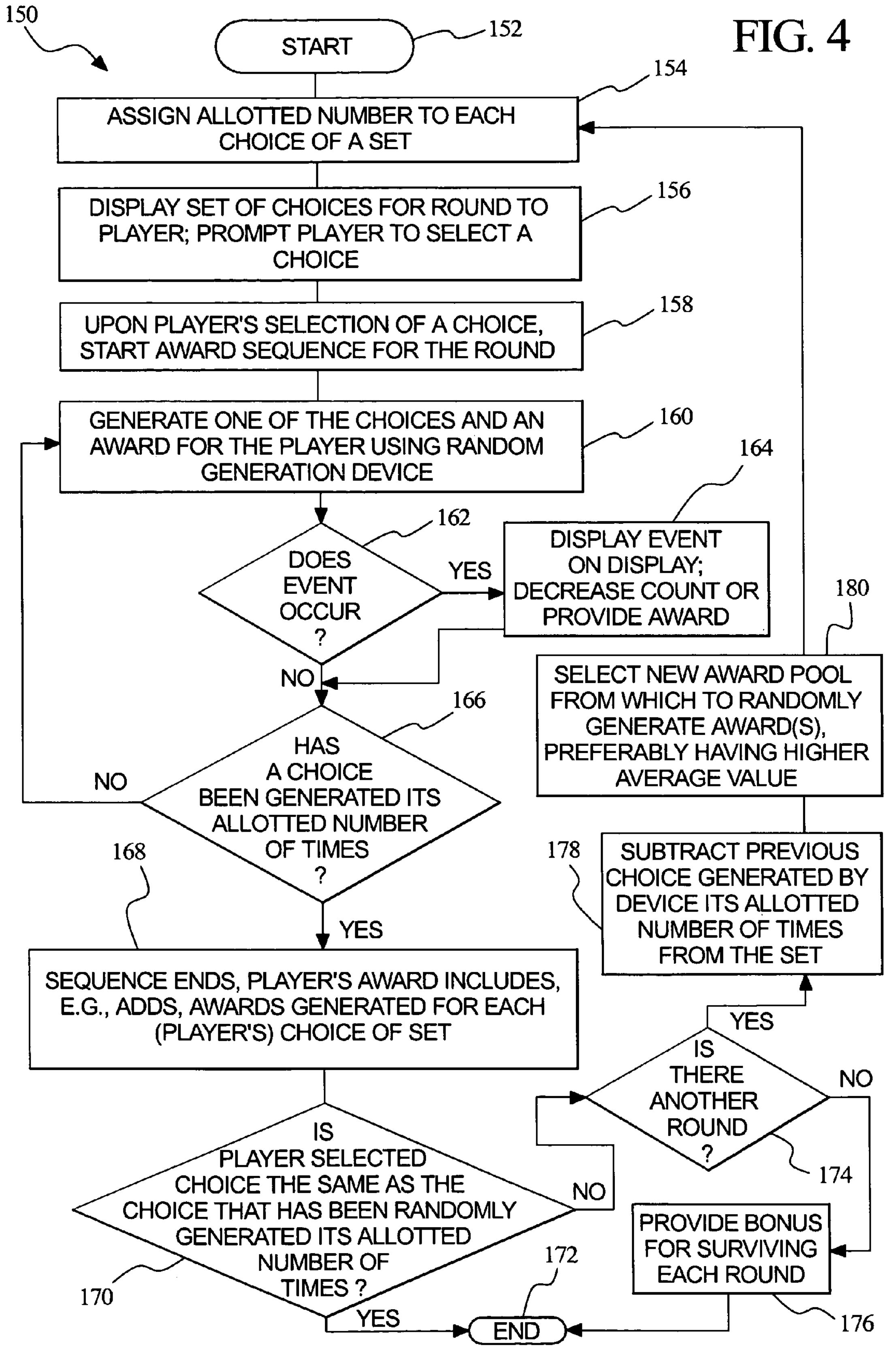
FIG. 4 is a logic flow diagram for another embodiment of a game program of the present invention.

Referring now to FIG. 4, another primary embodiment stored in the memory device 40 embodies the method 150. The method 150 is similar to the method 100 described in connection with FIG. 3. Upon the player's input of an appropriate amount of money, gaming device 10 begins the program embodying method 150, as indicated by oval 152. Gaming device 10 assigns an allotted number to each choice of a set as indicated by block 154. Gaming device 10 displays the set of choices on a display 30 or 32 for a round to the player, as indicated by block 156. Gaming device 10 provides an audio, visual, or audiovisual prompt to the player to select a choice from the set, as also indicated by block 156. Upon the player's selection of a choice, gaming device 10 begins an award sequence for the round, as indicated by block 158.

In the sequence, gaming device 10 generates one of the choices from the set and preferably an award in association with the generated choice, as indicated by block 160. Gaming device 10 employs one or more random generation devices to generate the choice and the award. As in the method 100, gaming device 10 may alternatively generate an award every other generation of a choice, only when the player's choice is generated or upon some other basis as desired by the game implementor.

Gaming device 10 randomly determines whether a modifier event occurs as indicated by diamond 162. If a modifier event occurs, gaming device 10 displays the event on a display 30 or 32, as indicated by block 164. As before, the event may include decreasing the tally or count for one or more or all of the choices, so that the one or more choices may be randomly generated more than their initial allotted number of times. In one implementation, the modifier event completely resets the round. In this way, gaming device 10 may generate more awards for the player before the sequence and the round ends. Alternatively, the event may include providing a multiplier that multiplies an award provided in the sequence or the total award for each sequence played.

Whether or not an event occurs, gaming device 10 after generating a choice and an award determines whether a choice has been generated its allotted number of times, as indicated by diamond 166. The method 150 is different from the method 100 because in the method 150, the first choice that is chosen its allotted number of times ends the award sequence. In the method 100, a plurality of choices or all of the choices may have to be randomly generated their allotted number of times. It should be appreciated in such a case, the method 150 likely ends sooner than in the method 100. In such a case, the player's number of accumulated awards for any given award sequence of a round in the method 150 is likely smaller than the number of awards in the method 100.

When the first choice has been randomly generated its allotted number of times, as determined in connection with diamond 166, the sequence ends and the player's award includes, e.g., sums the awards generated in association with each of the choices of the set. That is, even though the game ends when a single choice is selected its allotted number of times, the player accumulates awards associated with the generation of each of the choices before the round ends. Alternatively, for both methods 100 and 150, gaming device 10 may only accumulate awards generated in association with the choice that the player selects instead of all of the choices. In the method 150, another alternative embodiment includes providing only the awards generated in association with the choice, that is, the first to be generated its allotted number of times.

Another distinction between the method 150 and the method 100 is illustrated in connection with diamond 170. Here, instead of randomly picking one of the choices from the set, gaming device 10 employs the choice that has been generated its allotted number of times to compare against the choice selected by the player. The choice that the game uses to compare with the player's selected choice is still randomly generated in the method 150, however, this generation may be the combination of a plurality of random generations. For instance, if the game's choice has an associated allotted number of three, the game's choice is a combination of three random generations of that choice.

If the player's selected choice is the same as the game's generated choice, the game program employing the method 150 ends, as indicated by oval 172, and gaming device 10 transfers or provides any accumulated award to the player. If the player's selected choice is not the same as the game's generated choice, gaming device 10 determines whether another round exists, as indicated by diamond 174. If another round does not exist, gaming device 10 in a preferred embodiment provides a bonus award to the player for surviving each round stored in memory, as indicated by block 176.

If another round does exist, as determined in connection with diamond 174, gaming device 10 performs a number of updates before beginning the next round. Gaming device 10 in a preferred embodiment subtracts the previous choice generated by the random generation device of gaming device 10 from the next displayed set, as indicated by block 178. That is, whichever choice is the first to be generated in a given award sequence is the choice that will not appear in the set of choices for the next round. Gaming device 10 also preferably updates and increases the award pool for the next round, which preferably has higher average awards, as indicated by block 180.

The game program employing the method 150 cycles through the above-described process until: (i) gaming device 10 generates a choice its allotted number of times, which is also the same choice as the one the player selects; or (ii) the player survives each round. Gaming device 10 provides and downloads an award to the player equal to an accumulation of the awards generated in each award sequence before either of the game ending events occurs. The player may also receive a bonus award as indicated in connection with block 176.

Referring now to FIG. 5, an area of the memory device 40 includes data, such as in the form illustrated by data table 190, for allotting numbers to the choices. Data table 190 illustrates that gaming device 10 provides, in one embodiment, five choices on the display 30 or 32. Data table 190 illustrates the choices at the beginning of the game, whereby in successive rounds only four choices, three choices, two choices, etc., will be displayed on the display 30 or 32 as described above.

Each choice 192 has an associated number range 194. The number range 194 includes the possible numbers that may be associated or assigned to the choice. For example, gaming device 10 can assign any number one through five to Choice 1, assign only the numbers one, two and four to Choice 3 or assign the numbers one, three, five and seven to Choice 5. The number ranges 194 are adapted in accordance with the game mathematics. It should be appreciated that in either method 100 or 150, the player desires the highest or top allotted number to be assigned to each choice. That is, the player desires that the game has to generate Choice 1 five times, Choice 2 six times, Choice 3 four times, Choice 4 six times, and Choice 5 seven times in the method 100 or has to generate any one of these in the method 150.

The table 190 illustrates that each choice 192 has a different number range 194. In an alternative embodiment, a plurality of the choices 192 could have the same number range 194. Still further, each choice 192 may have the same number range 194. For example, each choice 192 in one implementation has the number range of 1, 2, 3, 4 and 5 currently illustrated as associated with Choice 1.

In another embodiment, one or more or all of the choices 192 have different number ranges in different rounds. For instance, in round 1, Choice 2 can have the 2, 4 and 6 number range 194 as illustrated, and in round 2 have a 1, 3 and 5 number range 194, etc. In a preferred embodiment, the average value of the numbers in the ranges 194 decreases as the rounds advance.

Referring now to FIG. 6, an area of the memory device 40 stores award information in an award pool such as award pool 200. In this embodiment, gaming device 10 provides the same award in any given award sequence of any given round. The award pool 200 is illustrated to work in conjunction with the allotted number table 190 of FIG. 5. That is, since the allotted number table 190 has five choices, one of which is the player's choice, the maximum number of rounds that may be played is four as indicated by the award pool 200. In round one, gaming device 10 provides an award of five each time a random generation device generates one of the choices from the set of five choices illustrated in the table 190. If the player advances to the second round, the gaming device 10 provides an award of ten for each random generation of a choice and so on.

If the player advances through each round of the award pool 200 of FIG. 6, gaming device 10 provides a bonus award 202 of fifty. Although not illustrated, an award pool similar to award pool 200 may be adapted to include a multiplier for one or more rounds when an event occurs that provides a multiplier to the player. The multipliers may increase on average in advancing rounds or be selected from a range of multipliers.

Figure 7:
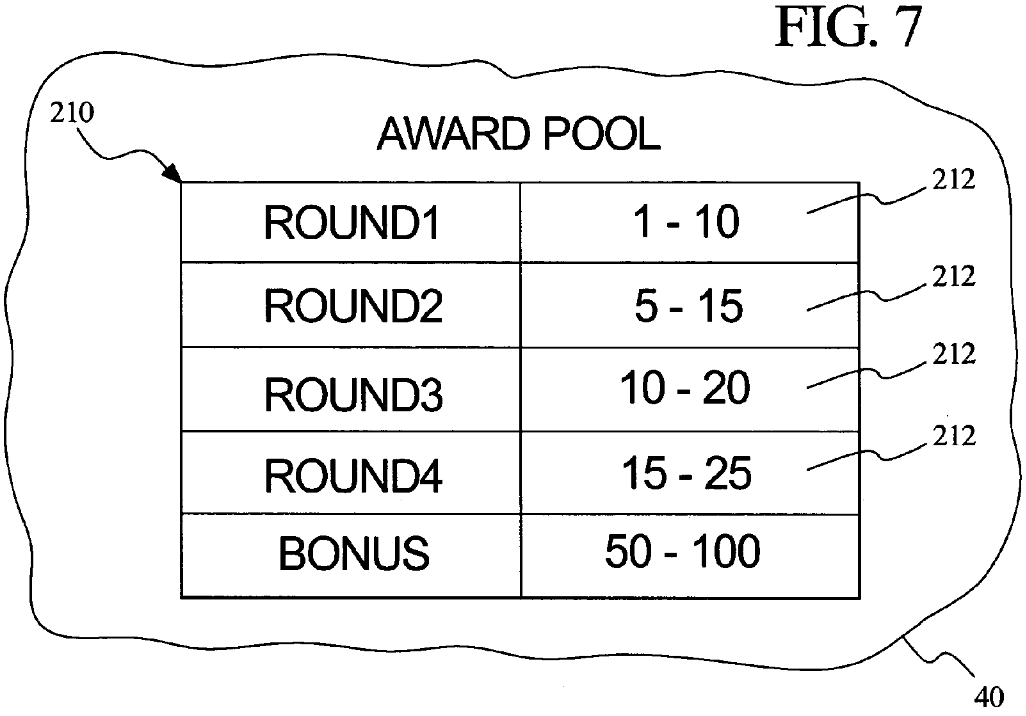
FIG. 7 schematically illustrates an area of memory having another embodiment of a data table for generating awards of the present invention.

Referring now to FIG. 7, an alternative award pool 210 is stored in the memory device 40. The award pool 210 includes four rounds as before, however, award pool 210 includes award ranges 212 as opposed to the single award used in the award pool 200. In the award pool 210, the award ranges 212 increase in subsequent rounds. Gaming device 10 randomly generates an award from the award ranges 212. In the award pool 210, each award of an award range 212 is equally weighted with the other awards of the same award range. Alternatively, as discussed below, the award ranges 212 may employ a non-equal weighting distribution.

The number ranges 194 of the allotted number table 190 and the award ranges 212 of the award pool 210 both, in a preferred embodiment; provide an associated number of at least one and an associated award of at least one credit. The awards of the award pools 200 and 210 are designed and selected according to the game mathematics.

Figure 8:
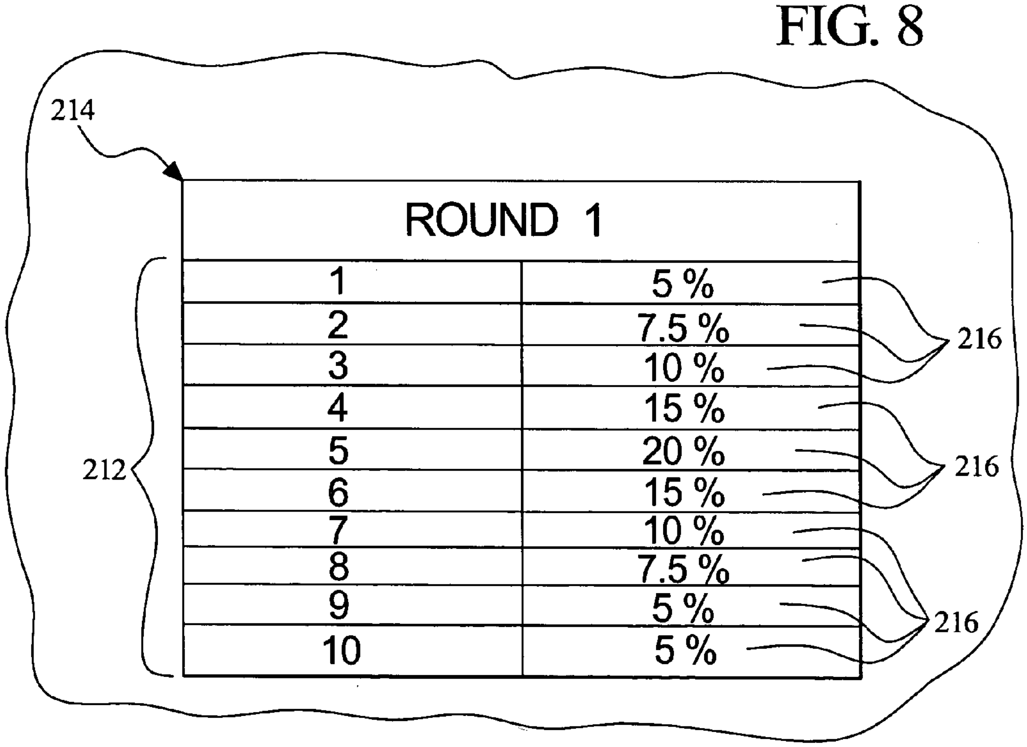
FIG. 8 schematically illustrates an area of memory having a further embodiment of a data table for generating awards of the present invention.

Referring now to FIG. 8, an alternative portion 214 of an award pool (only showing round one for ease of illustration) is stored in the memory device 40. This alternative portion 214 of round one illustrates that the awards for each round may be weighted. The portion 214 illustrates the round one award range 212 from the award pool 210. In the portion 214, each award one through ten of the range 212 has an associated likelihood or percentage 216. The percentages create a probability distribution for the awards of the award range 212. The game implementor distributes the percentages according to game mathematics. In the illustrated embodiment, the portion 214 provides that the five award has the highest probability 216 of twenty percent. The probabilities 216 taper off as the awards decrease towards one and increase towards ten.

Figure 9:
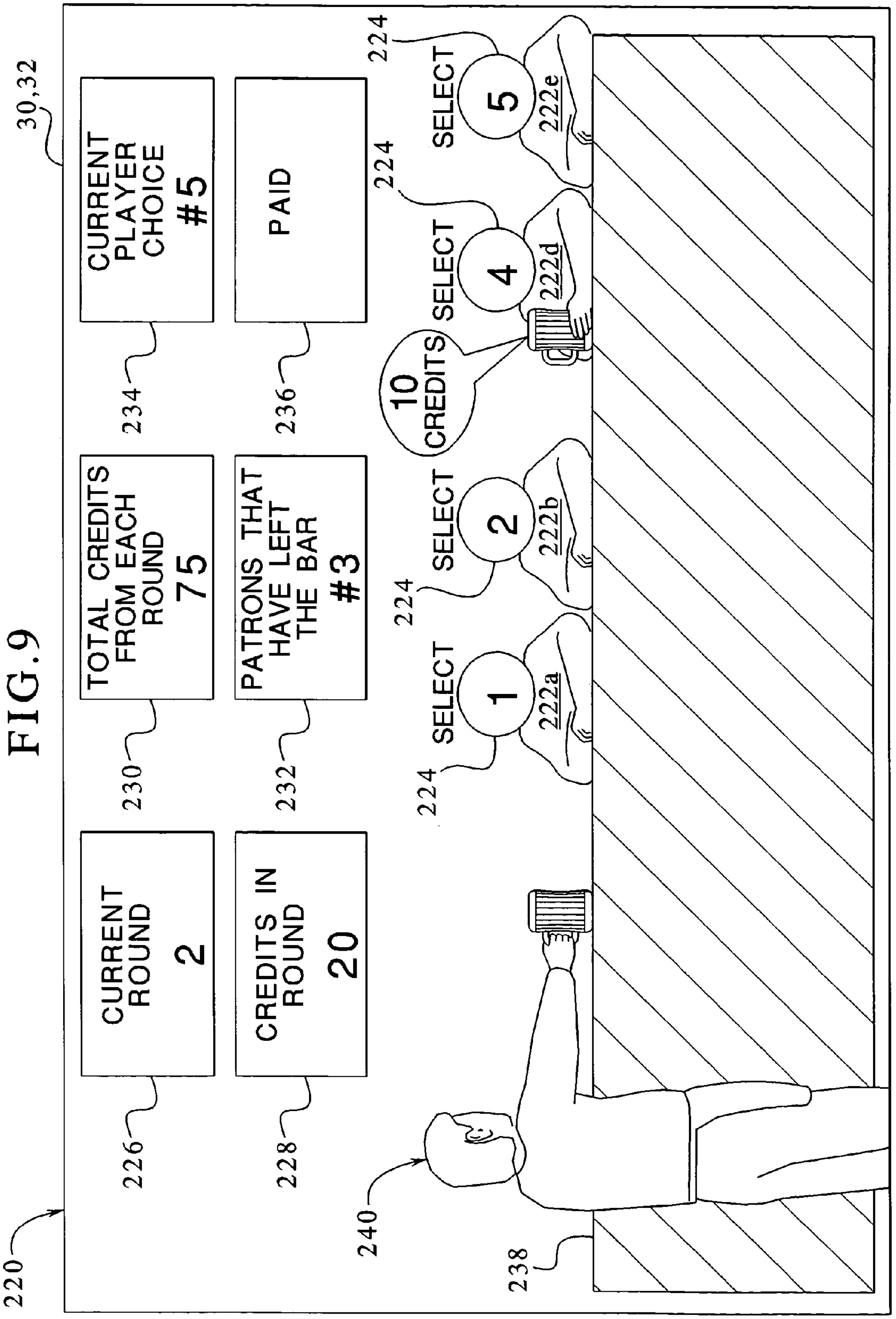
FIG. 9 is an elevation view of one display having a theme that depicts one of the logic sequences of the present invention.

Referring now to FIG. 9, either of the methods 100 or 150 may be displayed in a plurality of ways. Each of the displays includes a set of choices, one of which the player selects. Each display also includes a method by which gaming device 10 illustrates on the display 30 or 32 the generation of a choice from a set. The gaming device 10 preferably includes a display in accordance with a theme of the gaming device 10. The screen 220 of FIG. 9 corresponds to a saloon or tavern setting, wherein a bartender 240 serves drinks (and points) to patrons 222.

In FIG. 9 the screen 220 of one of the displays 30 or 32 illustrates one possible display embodiment. The screen 220 displays a plurality of choices 222*a*, 222*b*, 222*d* and 222*e* (collectively "220") to the player. In accordance with the allotted number table 190 of FIG. 5, the gaming device 10 provides five choices.

In the screen 220, however, only the one, two, four and five choices are displayed. As illustrated further below, choice three has previously been generated by gaming device 10 and is therefore no longer displayed. The display 30 or 32, as described above in connection with FIG. 2, includes a touch screen 50 in association with a touch screen controller 48. The touch screen 50 enables the player to select an area 224 associated with each choice 222*a* through 222*e*. As illustrated by a current round meter 226 and a current player choice meter 234, in the second round, the player has selected the choice five. The player selected choice five by pressing the area 224 associated with the five choice 222*e*.

The screen 220 updates the credits accumulated in round two in the meter 228. The screen 220 updates the total credits for each round that the player has played in the meter 230. It should be appreciated that the player accumulated fifty-five credits in round one and has now added twenty credits in the current round two.

It should also be appreciated from the meter 232, which shows patrons or choices that have been eliminated, Choice 3 was the first choice that gaming device 10 picked, as provided in connection with the method 100, or was the first choice generated its allotted number of times as provided in connection with the method 150. That is, Choice 3 is the choice that gaming device 10 used to compare with the player's selected choice in round one. Obviously, the player selected a different choice because the player is now currently playing round two as indicated by the round meter 226.

When the player successfully plays each round or selects the same choice that the gaming device generates, gaming device 10 transfers or provides the total awards accumulated in the meter 230 into a paid display 236. In a preferred embodiment the display 30 or 32 counts the number backward in the total credit meter 230 as the paid display accumulates to the number originally appearing in the total credit meter 230. This is commonly referred to as a credit roll-up.

The screen 220 illustrates one possible theme having a number of choices 222*a* to 222*e* which are patrons at a bar 238. A bartender 240 serves drinks to the choices 222*a* to 222*e*. The screen illustrates that the bartender 240 has served a drink to Choice 4 222*d*. That is, a random generation device generated Choice 4 and the same or a different random generation device generated an award of ten credits using one of the award pools 200, 210 or 214 illustrated above.

The display 220 illustrates Choice 4 receiving the drink and the provision of ten credits. In an embodiment where the player receives awards associated with every choice generation, the meter 228 increments by ten credits. However, in an embodiment wherein the player only receives awards generated when the player's selection has been generated, the meter 228 would not increment by the ten credits. As illustrated by the meter 234, the player's current choice is Choice 5.

In accordance with the theme of the gaming device, in a subsequent round the bartender may distribute more expensive drinks, i.e., drinks associated with more valuable awards. A bonus sequence may also include more expensive drinks and more valuable awards. The bartender 240 serves drinks until: (i) each choice is generated its allotted number of times, as illustrated in connection with the method 100; or (ii) gaming device 10 generates a first choice its allotted number of times.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A method of controlling a gaming device having a game operable upon a wager, said method comprising:

(a) displaying a set of a plurality of selections;

(b) enabling one of the selections to be picked by a player;

(c) after one of the selections is picked, providing an award to the player from an award pool;

(d) eliminating one of the selections from the set; and (e) repeating steps (a) to (d) until the player's picked selection is the same as the eliminated selection, wherein the set in each repeated step (d) is reduced to include non-eliminated selections.

2. The method of claim 1, which includes generating randomly at least one selection as part of step (c), wherein the award is associated with at least one of the generations.

3. The method of claim 1, which includes generating randomly a plurality of selections as part of step (c), associating a value from the pool with each one of the selections generated as part of step (c), wherein the award includes a combination of the associated values.

4. The method of claim 1, which includes associating each selection with a limit and generating the selections randomly and sequentially as part of the award generation step (c) until one of the selections is generated its limit of times.

5. The method of claim 4, which includes re-associating each remaining selection with a new limit for each repetition of steps (c) and (d).

6. The method of claim 5, wherein the selection generated its limit of times is the selection eliminated from the set is step (d).

7. The method of claim 1, which includes associating each selection with a limit and generating the selections randomly and sequentially as part of the award generation step (c) until each selection is generated its limit of times.

8. The method of claim 7, which includes re-associating each remaining selection with a new limit for each repetition of steps (c) and (d).

9. The method of claim 1, which includes generating the award from one of multiple award pools that on average increase in value during the repeating steps.

10. The method of claim 1, which includes repeating steps (a) to (d) if the player's picked selection is different than the eliminated selection unless steps (a) to (d) have been repeated a predetermined amount of times.

11. The method of claim 10, which includes providing a bonus award to the player for repeating steps (a) to (d) the predetermined number of times.

12. The method of claim 1, which includes generating one of the selections as a bonus event and providing the player a bonus award if the bonus generated selection matches the player's picked selection.

13. A method of controlling a game of a wagering gaming device, the method comprising:

(a) enabling a player to pick one of a set of n number of selections, n being at least two;
(b) generating at least one of the selections from the set for purposes of establishing an award for the player;
(c) designating one of the selections for comparison with the player's picked selection;
(d) reducing the number of selections in the set so that n=n−1; and
(e) repeating steps (a) to (d) as long as the player's picked selection is different than the designated selection.

14. The method of claim 13, wherein the subtracted selection from the set in step (d) is the selection previously generated in step (c).

15. The method of claim 13, which includes displaying the set of n selections to the player prior to enabling the player to pick one of the set of n selections.

16. The method of claim 13, which includes displaying the change of the selections of the set from n selections to n−1 selections.

17. The method of claim 13, wherein establishing the award for the player includes associating values with each generation of one of the selections of the set, wherein the award includes a combination of the generated values.

18. The method of claim 13, which includes associating each selection with a limit and generating the selections randomly and sequentially as part of step (b) until one of the selections is generated its limit of times.

19. The method of claim 18, which includes re-associating each remaining selection with a new limit for each repetition of steps (a) to (d).

20. The method of claim 13, which includes associating each selection with a limit and generating the selections randomly and sequentially as part of step (b) until each selection is generated its limit of times.

21. The method of claim 20, which includes re-associating each remaining selection with a new limit for each repetition of steps (a) to (d).

22. The method of claim 13, which includes repeating steps (a) to (d) if the player's picked selection is different than the designated selection unless steps (a) to (d) have been repeated a predetermined amount of times.

23. The method of claim 22, wherein the predetermined amount of times is n times.

24. The method of claim 22, which includes generating one of the selections as a bonus event and providing the player a bonus award if the bonus event selection matches the player's picked selection.

25. The method of claim 13, wherein the game is a bonus game of a base game selected from the group consisting of: slot, poker, keno and blackjack.

26. A gaming device operable under control of at least one processor, said gaming device comprising:

a set of selections;
a display device controlled by the at least one processor; and
an input device in communication with the at least one processor, wherein the at least one processor, the display device and the input device are operable to:
(a) display the set of selections to a player;
(b) enable the player to pick one of the selections;
(c) generate an award for the player;
(d) eliminate one of the selections from the set; and
(e) repeat steps (a) to (d) until the player's picked selection is the same as the eliminated selection, wherein the set in repeated step (d) is reduced to include non-eliminated selections.

27. The gaming device of claim 26, wherein the at least one processor is operable to randomly eliminate the selections from the set.

28. The gaming device of claim 26, which includes at least one award pool used to generate the award.

29. The gaming device of claim 26, wherein the input device includes a touch screen operable with the display device and the at least one processor, the touch screen enabling the player to pick one of the selections.

30. A gaming device operable under control of at least one processor, said gaming device comprising:

a set of n selections associated with a game, n being at least two;
a display device controlled by the at least one processor; and
an input device in communication with the at least one processor, wherein the at least one processor, the display device and the input device are operable to:
(a) enable a player to pick one of the set of n selections;
(b) generate at least one of the selections from the set for purposes of establishing an award for the player;
(c) designate one of the selections for comparison with the player's picked selection;
(d) eliminate the designated selection from the set so that n=n−1; and
(e) repeat steps (a) to (d) as long as the player's picked selection is different than the designated selection.

31. The gaming device of claim 30, wherein the game is a bonus game and which includes at least one input device for the player to operate a base game selected from the group consisting of: slot, poker, keno and blackjack.

32. The gaming device of claim 30, wherein the game is provided via a data network or on a computer storage device.

33. The gaming device of claim 32, wherein the data network includes an internet.

* * * * *